(12) United States Patent
Karlsson et al.

(10) Patent No.: US 9,923,450 B2
(45) Date of Patent: Mar. 20, 2018

(54) SWITCHED MODE POWER SUPPLY COMPENSATION LOOP

(71) Applicant: TELEFONAKTIEBOLAGET L M ERICSSON (PUBL), Stockholm (SE)

(72) Inventors: Magnus Karlsson, Oskarshamn (SE); Andreas Larsson, Kalmar (SE); Oscar Persson, Kalmar (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 35 days.

(21) Appl. No.: 14/912,564

(22) PCT Filed: May 21, 2015

(86) PCT No.: PCT/EP2015/061256
§ 371 (c)(1),
(2) Date: Feb. 17, 2016

(87) PCT Pub. No.: WO2016/184524
PCT Pub. Date: Nov. 24, 2016

(65) Prior Publication Data
US 2017/0163142 A1 Jun. 8, 2017

(51) Int. Cl.
*H02M 3/157* (2006.01)
*H02M 1/14* (2006.01)
(Continued)

(52) U.S. Cl.
CPC ............... *H02M 1/14* (2013.01); *H02M 1/12* (2013.01); *H02M 3/04* (2013.01); *H02M 5/04* (2013.01); *H02M 7/04* (2013.01); *H02M 7/44* (2013.01)

(58) Field of Classification Search
CPC ......... H02M 2001/0012; H02M 3/156; H02M 3/157; H02M 3/158
See application file for complete search history.

(56) References Cited

U.S. PATENT DOCUMENTS

| 4,891,744 A | 1/1990 | Yamamoto et al. |
| 7,696,913 B2 * | 4/2010 | Melanson ........... H02M 1/4225 341/143 |

(Continued)

FOREIGN PATENT DOCUMENTS

| EP | 0637789 A1 | 2/1995 |
| JP | 2010011719 A | 1/2010 |

(Continued)

*Primary Examiner* — Gary L Laxton

(57) ABSTRACT

There is provided a controller for controlling an output current of a switched mode power supply, SMPS. The controller comprises a sampling module arranged to sample a signal indicative of the output current of the SMPS at a frequency higher than a switching frequency of the SMPS, and a filter module arranged to filter out a ripple component of the sampled signal. The filter module comprises: a ripple component estimation module arranged to estimate the ripple component; a moving average calculation module arranged to calculate a moving average of the sampled signal; and a subtraction module arranged to generate a filtered signal by subtracting the estimated ripple component from the sampled signal and the calculated moving average. The controller also has a switching control module arranged to generate a control signal for controlling at least one of the switching frequency and a switching duty cycle of the SMPS based on the filtered signal.

28 Claims, 9 Drawing Sheets

(51) Int. Cl.
  *H02M 7/04* (2006.01)
  *H02M 3/04* (2006.01)
  *H02M 5/04* (2006.01)
  *H02M 7/44* (2006.01)
  *H02M 1/12* (2006.01)

(56) References Cited

U.S. PATENT DOCUMENTS

| | | | |
|---|---|---|---|
| 8,698,469 B1* | 4/2014 | Latham, II | H02M 1/15 |
| | | | 323/283 |
| 8,816,660 B2* | 8/2014 | Trautmann | H02M 3/158 |
| | | | 323/282 |
| 2007/0092040 A1 | 4/2007 | Higashino | |
| 2008/0272756 A1* | 11/2008 | Melanson | H02M 1/4225 |
| | | | 323/282 |

FOREIGN PATENT DOCUMENTS

| | | |
|---|---|---|
| JP | 2011146299 A | 7/2011 |
| WO | 2016173643 A1 | 11/2016 |

* cited by examiner

SWITCHED MODE POWER SUPPLY COMPENSATION LOOP

This application is a 371 of International Application No. PCT/EP2015/061256, filed May 21, 2015, the disclosure of which is fully incorporated herein by reference.

TECHNICAL FIELD

The present invention generally relates to the field of switched mode power supplies (sometimes referred to as switch mode power supplies or switching mode power supplies) and more specifically to the feedback control loop of a switched mode power supply that is used to regulate the power supply's output current or voltage.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted by a feedback loop (also widely referred to as a "compensation loop" or "feedback circuit") to convert an input voltage to a desired output voltage. A SMPS may take the form of a rectifier (AC/DC converter), a DC/DC converter, a frequency changer (AC/AC) or an inverter (DC/AC).

The feedback loop typically comprises a controller that controls the switching frequency or the switching duty cycle of the switching element(s) of the SMPS based on the output voltage and/or output current of the SMPS, in accordance with a control law defined by one or more control law parameters, to regulate the output voltage of the SMPS (in a constant voltage (CV) mode of operation) or the output (or choke) current of the SMPS (in a constant current (CC) mode of operation), keeping it in the vicinity of a predetermined value. For example, the SMPS may comprise a Proportional-Integral-Derivative (PID) controller that regulates the duty cycle (or the switching frequency, as the case may be) of the switching element(s) to keep the output voltage of the SMPS constant, in accordance with a PID control law that is characterised by the values of the P, I and D control parameters set in the PID controller.

To achieve a good feedback loop response and avoid oscillations, digital SMPS controllers operating in CV mode typically employ a filtering process that attenuates the usual voltage ripple that propagates to the feedback loop from the output of the SMPS. This voltage ripple is a substantially periodic oscillation in the output voltage of the SMPS, which is typically small in relation to the output voltage of the SMPS, and which may occur as a result of an incomplete suppression of an output alternating waveform by the SMPS's output filter. Conventional digital SMPS controllers usually attenuate the ripple component by oversampling the output voltage of the SMPS (or an error signal indicative of a difference between the output voltage and a reference voltage) and manipulating the oversampled signal using an appropriately configured Finite Impulse Response (FIR) or Infinite Impulse Response (IIR) filter, e.g. a moving average filter or a decimation filter. Such filtering processes cause the voltage ripple component of the oversampled signal to be suppressed, thus allowing the low-bandwidth signal (i.e. voltage deviations due to transients) to be obtained for use in output voltage regulation. Where the feedback control loop of the SMPS utilises measurements of the SMPS's choke current to regulate the output current or the output voltage of the SMPS, similar techniques are used to suppress the ripple component of the choke current.

SUMMARY

The present inventors have recognised that the conventional filter designs outlined above have the disadvantage of introducing a delay in the signal, which degrades the performance of the feedback loop. More particularly, these filter designs introduce a phase lag and distort the shape of the signal in the time domain, making real-time control of the SMPS's output voltage or output current difficult or impossible.

Having recognised these drawbacks, the present inventors have devised a scheme for controlling the output voltage or the output current of an SMPS based on measurements of the SMPS's output current, which exploits the reproducibility (or near-reproducibility) of the ripple component of the current over a number of switching periods during stable operation of the SMPS to obtain a good estimate of the prevailing ripple component. This estimate of the ripple component is subtracted from the feedback signal that is indicative of the output current to yield the remaining signal, which exhibits little or no delay or distortion.

More specifically, the inventors have devised controller for controlling an output current of an SMPS, the controller comprising a sampling module arranged to sample a signal indicative of the output current of the SMPS at a frequency higher than a switching frequency of the SMPS, and a filter module arranged to filter out a ripple component of the sampled signal. The filter module comprises: a ripple component estimation module arranged to estimate the ripple component by calculating, for each sample of a plurality of the samples of the signal, an average sample value using the sample value and sample values obtained at corresponding points in preceding switching periods of the SMPS, the sample at each of said corresponding points being separated from said sample of the plurality of samples by a respective integer number of switching periods of the SMPS; a moving average calculation module arranged to calculate a moving average of the sampled signal by calculating, for each sample of the plurality of the samples of the signal, an average of a predetermined number of preceding sample values; and a subtraction module arranged to generate a filtered signal by subtracting the estimated ripple component from the sampled signal and the calculated moving average. The controller further comprises a switching control module arranged to generate a control signal for controlling at least one of the switching frequency and a switching duty cycle of the SMPS based on the filtered signal.

The inventors have further devised a controller for controlling an output voltage of an SMPS, the controller comprising a sampling module arranged to sample a signal indicative of an output current of the SMPS at a frequency higher than a switching frequency of the SMPS, and a filter module arranged to filter out a ripple component of the sampled signal. The filter module comprises: a ripple component estimation module arranged to estimate the ripple component by calculating, for each sample of a plurality of the samples of the signal, an average sample value using the sample value and sample values obtained at corresponding points in preceding switching periods of the SMPS, the sample at each of said corresponding points being separated from said sample of the plurality of samples by a respective integer number of switching periods of the SMPS; a moving average calculation module arranged to calculate a moving average of the sampled signal by calculating, for each sample of the plurality of the samples of the signal, an average of a predetermined number of preceding sample values; and a subtraction module arranged to generate a filtered signal by subtracting the estimated ripple component from the sampled signal and the calculated moving average. The controller further comprises a second sampling module arranged to sample, at a frequency higher than a switching frequency of the SMPS, a second signal that is indicative of the output voltage of the SMPS. The controller further comprises a switching control module arranged to generate a control signal for controlling at least one of the switching frequency and a switching duty cycle of the SMPS based on the filtered signal and the sampled second signal.

The inventors have further devised a switched mode power supply comprising a controller as set out above.

The inventors have further devised a method of controlling an output current of an SMPS, the method comprising: sampling a signal indicative of the output current of the SMPS at a frequency higher than a switching frequency of the SMPS; estimating a ripple component of the sampled signal by calculating, for each sample of a plurality of the samples of the signal, an average sample value using the sample value and sample values obtained at corresponding points in preceding switching periods of the SMPS, the sample at each of said corresponding points being separated from said sample of the plurality of samples by a respective integer number of switching periods of the SMPS; calculating a moving average of the sampled signal by calculating, for each sample of the plurality of the samples of the signal, an average of a predetermined number of preceding sample values; generating a filtered signal by subtracting the estimated ripple component from the sampled signal and the calculated moving average; and generating a control signal for controlling at least one of the switching frequency and a switching duty cycle of the SMPS based on the filtered signal.

The inventors have further devised a method of controlling an output voltage of an SMPS, the method comprising: sampling a signal indicative of an output current of the SMPS at a frequency higher than a switching frequency of the SMPS; estimating a ripple component of the sampled signal by calculating, for each sample of a plurality of the samples of the signal, an average sample value using the sample value and sample values obtained at corresponding points in preceding switching periods of the SMPS, the sample at each of said corresponding points being separated from said sample of the plurality of samples by a respective integer number of switching periods of the SMPS; calculating a moving average of the sampled signal by calculating, for each sample of the plurality of the samples of the signal, an average of a predetermined number of preceding sample values; and generating a filtered signal by subtracting the estimated ripple component from the sampled signal and the calculated moving average; sampling, at a frequency higher than a switching frequency of the SMPS, a second signal that is indicative of the output voltage of the SMPS; and generating a control signal for controlling at least one of the switching frequency and a switching duty cycle of the SMPS based on the filtered signal and the sampled second signal.

The inventors have further devised a computer program product, comprising a signal or a non-transitory computer-readable storage medium carrying computer program instructions which, when executed by a processor, cause the processor to perform at least one of the methods as set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Embodiment 1

Figure 1:
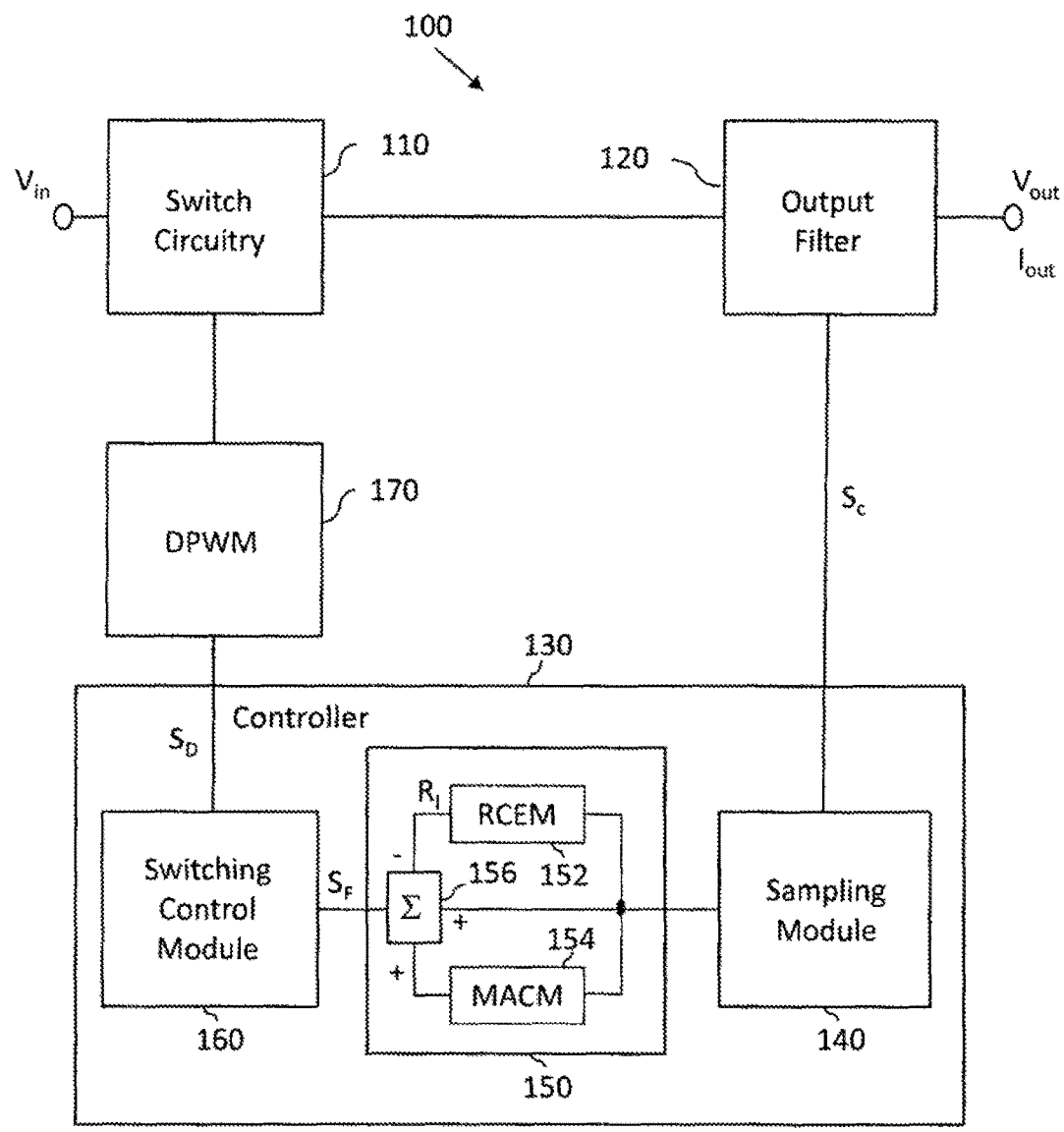
FIG. 1 illustrates functional components of a switched mode power supply according to a first embodiment of the present invention.

FIG. 1 is a schematic showing an SMPS 100 according to a first embodiment of the present invention.

In the present embodiment, the SMPS 100 comprises switch circuitry 110 having at least one switching element (e.g. MOSFET) that is arranged in the switch circuitry 110 and controlled to switch at a high frequency (e.g. tens to hundreds of kHz) and with a duty cycle so as to convert an input DC voltage $V_{in}$ of the SMPS 100 to an output voltage, which is filtered by a low-pass filter 120 of the SMPS (e.g. a first order LC filter comprising an inductor and one or more capacitors) to generate an output a DC voltage, $V_{out}$, of the SMPS 100. The switch circuitry 110 may, as in the present embodiment, include an isolation transformer having a primary winding driven by a primary side circuit, and a secondary winding electromagnetically coupled to the primary winding and arranged to drive a secondary side circuit typically comprising a rectifying network, the one or more switching elements being provided in one or both of the primary and secondary side circuits. Suitable circuit topologies (e.g. buck, boost, isolated or not) and other details of the switch circuitry 110 (e.g. whether it is configured to be soft-switched or hard-switched), as well as details of the output filter 120, are well-known to those skilled in the art and will therefore not be described here.

The SMPS 100 further comprises a feedback loop which is arranged to regulate the output current $I_{out}$ of the SMPS 100 in accordance with a control law that is characterised by one or more control law parameters (e.g. PID values). The feedback loop operates on the basis of a signal that is indicative of the output current $I_{out}$ of the SMPS 100, which may be obtained using techniques well-known to those skilled in the art. This signal may, as in the present embodiment, be a signal $S_C$ indicative of the current flowing through the choke in the output filter 120, which may be measured simply by measuring a voltage drop across the choke or a shunt connected thereto, for example.

The feedback loop comprises a controller 130 that includes a sampling module 140 arranged to sample the signal $S_C$ at a frequency higher than a switching frequency, $f_{SW}$, of the SMPS 100, and temporarily store the sampled values. The sampling module 140 may, as in the present embodiment, oversample the signal $S_C$ by an integer factor N=16. Naturally, the oversampling factor N is not limited to 16 and may take any other integer value selected by the user. In embodiments where N is an integer and the operation of the sampling module 140 is synchronised with the transistor drive signals, N samples of the signal $S_C$ are obtained in each switching period T of the SMPS 100, with the $i^{th}$ sample in each switching period being spaced apart from the $i^{th}$ sample in the next (or previous) switching period by the switching period T of the SMPS, and with each of these samples having been obtained at the same time relative to the start of the respective switching period. Thus, the sampling module 140 can be considered to sample and hold N sets of corresponding samples of the signal $S_C$, with the sample acquisition times of the samples in each set being spaced apart from one another by the switching period T. The number of samples in each of these sets may also be selected by the user, and can be considered to define a (moving) time window within which corresponding samples are averaged, as explained further below.

The controller 130 also includes a filter module 150 arranged to filter out the ripple component of the sampled signal. The filter module 150 comprises a ripple component estimation module which is, in general, arranged to estimate the ripple component by calculating, for each or some of the samples of the signal that have been received from the sampling module 140, an average sample value (e.g. a mean or a weighted average) using the sample value itself and sample values obtained at corresponding points in preceding switching periods of the SMPS 100, each of said corresponding points being separated from the sample by a respective integer number of switching periods of the SMPS. The corresponding points may alternatively be separated from said sample by a respective interval whose length is substantially equal to (i.e. within a tolerance band, such as 2%, 5% or 10%, of) said respective integer number of switching periods. In the present embodiment, the ripple component estimation module (RCEM) 152 is arranged to calculate a weighted average of the sample values (including the sample value itself) in the time window for each of the aforementioned N sets of samples. In this way, the ripple component estimation module 152 is able to obtain a good estimate of what the ripple component $R_I$ should be at any point in time, by exploiting the reproducibility of the ripple from one switching period to the next during stable operation of the SMPS 100 (when no transients appear). The averaging process suppresses the influence of outlying sample values on the mean sample value, thereby allowing the ripple component $R_I$ to be estimated with relatively high accuracy.

Figure 2:
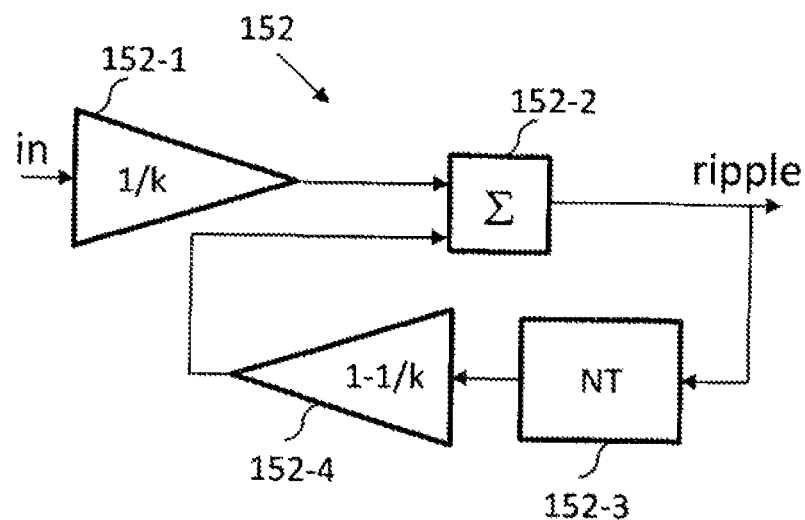
FIG. 2 shows an example implementation of the ripple component estimation module illustrated in FIG. 1.

In the present embodiment, the ripple component estimation module 152 is arranged to estimate the ripple component $R_I$ using an interpolated low-pass filter in the exemplary form of a first-order interpolated recursive moving average filter, as illustrated in FIG. 2. The factor k shown in FIG. 2 is approximately equal to the number of switching periods which are considered in the calculation of the average. It should be noted that the interpolated low-pass filter need not be of first order, as in the present embodiment, but may alternatively be of order 2 or higher.

The interpolated recursive moving average filter in the example of FIG. 2 comprises a first scaling module 152-1 arranged to receive sample values of the sampled signal and scale each of the received sample values by a factor 1/k, and a summing module 152-2 arranged to add each of the scaled sample values to a respective sum of scaled sample values to generate a respective addition result. As shown in FIG. 2, the interpolated recursive moving average filter further comprises a feedback loop that processes the output of the summing module 152-2 and feeds the processing results back to an input of the summing module 152-2. In more detail, the feedback loop comprises a delay module 152-3 (e.g. in the form of a First-In, First-Out (FIFO) buffer) which is arranged to receive the addition results in the order in which the addition results are generated by the summing module 152-2, to store N of the received addition results at any one time, and to output a stored addition result in response to an addition result being received by the delay module 152-3 so that the stored addition results are output in the same order as they were received by the delay module 152-3. The feedback loop also includes a second scaling module 152-4, which is arranged to receive the addition results from the delay module 152-3 in the order in which they are output by the delay module 152-3, and to scale each received addition result by a factor 1-1/k in order to generate the respective sum of scaled sample values that is to be added to the respective scaled sample value by the summing module 152-2.

The transfer function from the input, in(z), to the output of the filter in FIG. 2, ripple(z), is given by $$\text{ripple}(z) = \frac{1/k}{1-(1-1/k)z^{-N}} in(z). \qquad \text{Eqn. 1}$$

Referring again to FIG. 1, as the underlying, low-frequency component of the sampled signal from the sampling module 140 (in other words, the slowly-varying "background" current level corresponding to the load current of the SMPS 100) needs to be preserved by the filter module 150 for use by the switching control module 160 to generate an appropriate signal $S_D$ for regulating the SMPS's output current $I_{out}$, the filter module 150 also has a moving average calculation module (MACM) 154 that is arranged to calculate a moving average of the sampled signal by calculating, for each sample of a plurality of the samples of the signal, an average (e.g. a mean) of a predetermined number of preceding sample values (e.g. in the present embodiment, kN preceding sample values).

The moving average calculation module 154 may, as in the present embodiment, be provided in the form of a non-interpolated low-pass filter, while the ripple component estimation module 152 can be provided in the form of an interpolated low-pass filter, as noted above. In the present embodiment, these low-pass filters have matching (i.e. the same) time constants. More specifically, the moving average calculation module 154 may be a non-interpolated low-pass filter in the form of a modified moving average (MMA) filter as described below. However, the moving average calculation module 154 may alternatively employ a standard moving average filter (although this would be less attractive from a computation and memory resource requirement point of view) or a low-pass filter of a higher order, which may have a time constant matching that of the interpolated low-pass filter of the ripple component estimation module 152.

Figure 3:
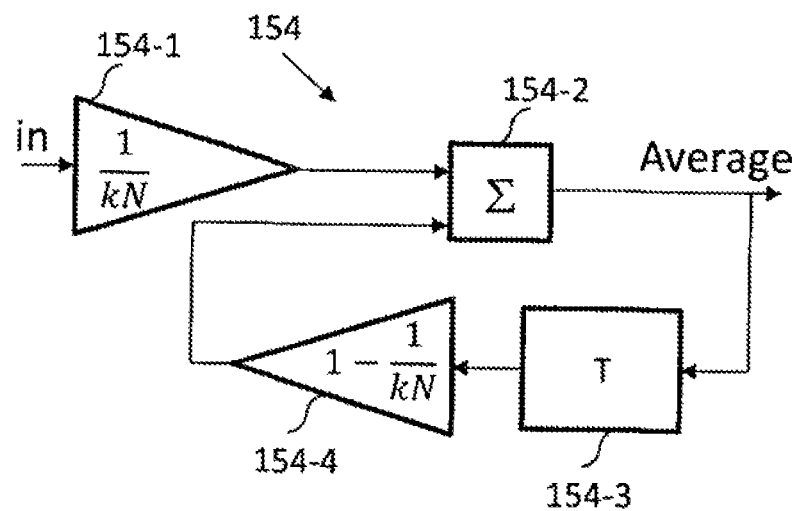
FIG. 3 shows an example implementation of the moving average calculation module illustrated in FIG. 1.

In the present embodiment, the moving average calculation module 154 comprises a non-interpolated modified moving average filter as illustrated in FIG. 3. The moving average calculation module 154 comprises a scaling module 154-1 arranged to receive sample values of the sampled signal from the sampling module 140 and scale each of the received sample values by a factor 1/kN, and a summing module 154-2 arranged to add each of the scaled sample values from the scaling module 154-1 to a respective sum of scaled sample values to generate a respective addition result. Thus, comparing with FIG. 2, the coefficient k is replaced with kN, which makes the averaging time equal to the time constant of the ripple component estimation module 152. As shown in FIG. 3, the moving average calculation module 154 further comprises a feedback loop that processes the output of the summing module 154-2 and feeds the processing results back to an input of the summing module 154-2. In more detail, the feedback loop comprises a delay module 154-3, which is arranged to receive the addition results in the order in which the addition results are generated by the summing module 154-2, to store one received addition result at a time, and to output a stored addition result in response to an addition result being received by the delay module 154-3 so that the stored addition results are output in the same order as they were received by the delay module 154-3. The feedback loop also includes a second scaling module 154-4, which is arranged to receive the addition results from the delay module 154-3 in the order in which they are output by the delay module 154-3, and to scale each received addition result by a factor 1-1/kN in order to generate the respective sum of scaled sample values that is to be added to the respective scaled sample value by the summing module 154-2.

The transfer function from the input, in(z), to the output of the filter in FIG. 3, average(z), is given by $$\text{average}(z) = \frac{1/(kN)}{1-(1-1/(kN))z^{-1}} in(z). \qquad \text{Eqn. 2}$$

Referring again to FIG. 1, the filter module 150 also includes a subtraction module 156, which is arranged to subtract the estimated ripple component $R_I$ from the sampled signal and the calculated moving average to generate a filtered signal $S_F$.

The controller 130 also has a switching control module 160, which is arranged to generate a control signal $S_D$ for regulating the switching duty cycle of the SMPS 100 based on the filtered signal $S_F$ from the filter module 150. The switching control module 160 may alternatively be configured to adjust the switching frequency of the SMPS 100, as noted above, or it may adjust both the switching duty cycle and the switching frequency of the SMPS 100. In such alternative embodiments, the sampling module 140 may be arranged to adjust its sampling frequency so as to keep it an integer multiple of the switching frequency.

Using Eqns. 1 and 2, the transfer function for the $S_F(z)$ signal in FIG. 1 can be expressed as follows:

$$S_F(z) = 1 + \text{average}(z) - \text{ripple}(z) = \qquad \text{Eqn. 3}$$
$$\left[1 + \frac{1/(kN)}{1-(1-1/(kN))z^{-1}} - \frac{1/k}{1-(1-1/k)z^{-N}}\right] in(z)$$

In other embodiments, the ripple component estimation module 152 may be arranged to estimate the ripple component $R_I$ using a first-order interpolated low-pass filter in the alternative form of an interpolated Finite Impulse Response (FIR) filter (e.g. an interpolated moving average filter). Higher-order interpolated low-pass filters may alternatively be used, as will be discussed in the following.

In the present embodiment, the switching control module 160 takes the exemplary form of a PID regulator (also referred to herein as a PID controller) that regulates the duty cycle of the switching element(s) to keep the output voltage of the SMPS 100 constant, on the basis of received signal from the filter module 150 and in accordance with a PID control law that is characterised by the values of the P, I and D control parameters set in the PID regulator. However, in alternative embodiments, another kind of regulator, which regulates the output current of the SMPS 100 in accordance with a different control law that is defined using a different set of one or more control law parameters, may be used in place of the PID regulator. The PID regulator is arranged to generate control signals $S_D$ (indicative of the required switching duty cycle) to control a digital pulse width modulator (DPWM) 170 also included in the feedback loop, to appropriately control the switching of the switching element(s) in the switch circuitry 110. The functionality of the components of the feedback loop illustrated in FIG. 1, and alternative ways of implementing and distributing these components among the primary and secondary sides of the isolation barrier of the SMPS 100 (where one is provided, as in the present embodiment), will be familiar to those skilled in the art, such that it is unnecessary to provide further details here.

Figure 4:
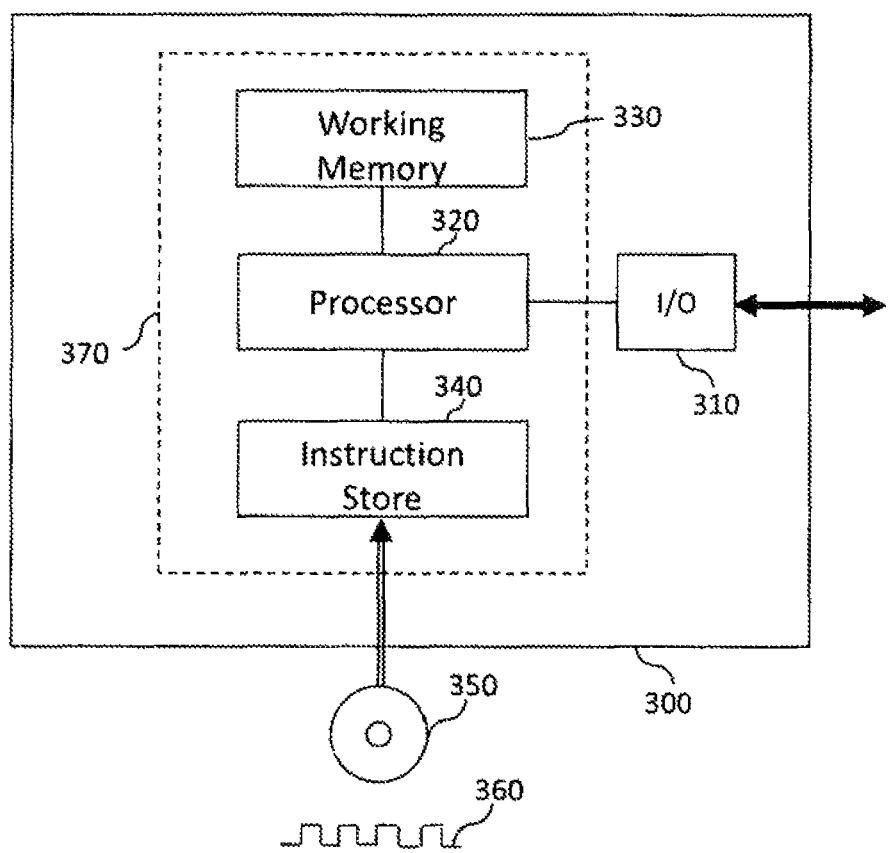
FIG. 4 shows an exemplary hardware implementation of the controller shown in FIG. 1.

FIG. 4 shows an exemplary implementation of the controller 130, in programmable signal processing hardware. The signal processing apparatus 300 shown in FIG. 4 comprises an input/output (I/O) section 310 for receiving the signal $S_C$ and transmitting control signals $S_D$ to the DPWM 170. The signal processing apparatus 300 further comprises a processor 320, a working memory 330 and an instruction store 340 storing computer-readable instructions which, when executed by the processor 320, cause the processor 320 to perform the processing operations hereinafter described to generate control signals for controlling the output current of the SMPS 100. The instruction store 340 may comprise a ROM which is pre-loaded with the computer-readable instructions. Alternatively, the instruction store 340 may comprise a RAM or similar type of memory, and the computer readable instructions can be input thereto from a computer program product, such as a computer-readable storage medium 350 such as a CD-ROM, etc. or a computer-readable signal 360 carrying the computer-readable instructions.

In the present embodiment, the combination 370 of the hardware components shown in FIG. 4, comprising the processor 320, the working memory 330 and the instruction store 340, is configured to implement the functionality of the aforementioned sampling module 140, filter module 150 (including the ripple component estimation module 152, the moving average calculation module 154 and the subtraction module 156) and switching control module 160, which will now be described in detail with reference to FIG. 5.

Figure 5:
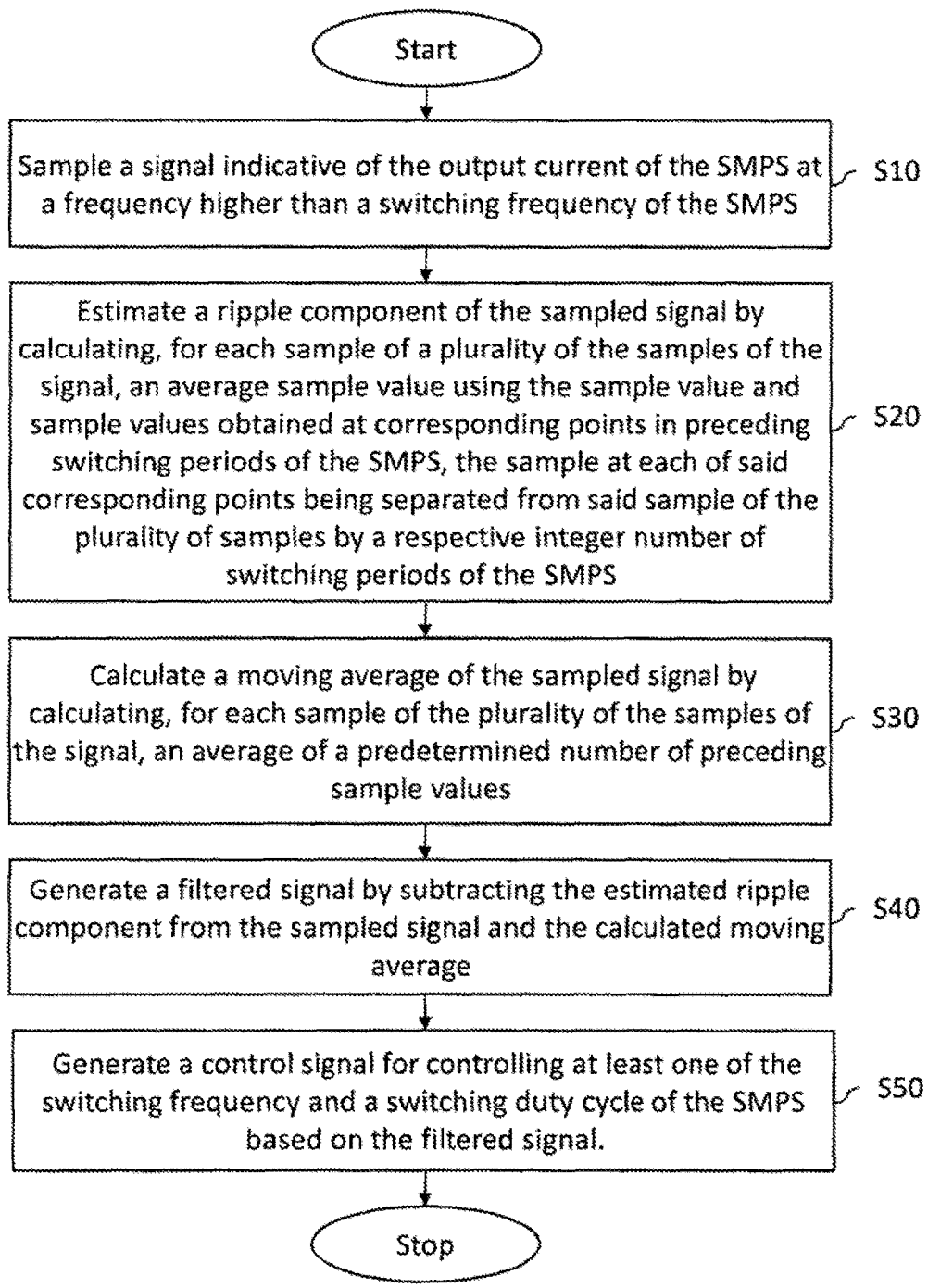
FIG. 5 is a flow diagram illustrating operations performed by the controller in the first embodiment to generate control signals for controlling the output current of the SMPS.

FIG. 5 is a flow chart illustrating operations performed by the controller 130 in the first embodiment to generate control signals for controlling the output current of the SMPS 100.

In step S10, the sampling module 140 samples the signal $S_C$ (as an example of a signal indicative of the output current of the SMPS 100) at a frequency higher than a switching frequency, $f_{SW}$, of the SMPS 100.

In step S20, the ripple component estimation module 152 estimates the ripple component $R_I$ by calculating, for each or some of the samples of the signal, an average sample value using the sample value and sample values obtained at corresponding points in preceding switching periods of the SMPS 100, the sample at each of said corresponding points being separated from the latest sample under consideration by a respective integer number of switching periods of the SMPS. More particularly, in the present embodiment, the ripple component estimation module 152 calculates a weighted average of the sample values including the sample value, in the time window for each of the aforementioned N sets of samples. As explained above, the ripple component estimation module 152 estimates the ripple component $R_I$ using an interpolated low-pass filter in the exemplary form of a first-order interpolated recursive moving average filter, as illustrated in FIG. 2. As noted above, the ripple component estimation module 152 may alternatively estimate the ripple component $R_I$ in step S20 using a first-order interpolated low-pass filter in the form of an interpolated FIR filter (e.g. an interpolated moving average filter). As a further alternative, higher-order interpolated low-pass filters may be used.

In step S30, the moving average calculation module 154 calculates a moving average of the sampled signal by calculating, for each sample of the plurality of samples of the signal, an average of a predetermined number of preceding sample values.

In step S40, the subtraction module 156 generates the filtered signal $S_F$ by subtracting the estimated ripple component $R_I$ from the sampled signal and the calculated moving average.

Finally, in step S50, the switching control module 160 generates a control signal $S_D$ for controlling the switching duty cycle D of the SMPS 100 based on the filtered signal $S_F$ obtained in step S40.

The parallel structure of the ripple component estimation module 152 and the moving average calculation module 154 described above is advantageous in terms of coefficient sensitivity, due to the simple multiplications that are performed. Further improvements can be achieved by choosing each of the factors N and k to be a power of 2. For example, in the simulations described below, N=16 and k=32 mean that 1/32 corresponds to a right-shift of 5 bits, and 1/(Nk)=512 corresponds to a right-shift of 9 bits. The coefficient 1-1/k is preferably calculated by subtracting a right-shifted $\log_2(k)$ bits version from the input. Hence, all the multiplications can be made very simple, and only increase the data word length by 9 bits using full precision.

In the first embodiment described above, a signal $S_C$ indicative of the output current of the SMPS 100 is sampled by the sampling module 140 and processed by the filter module 150 to produce a filtered signal $S_F$ that is used by the switching control module 160 to regulate the output current of the SMPS 100. The SMPS 100 may be configured to operate in this way as a constant current source, regardless of its output voltage level. Alternatively, the SMPS 100 may be operable in a constant voltage (CV) mode to conventionally regulate the output voltage $V_{out}$ based on a signal indicative of $V_{out}$ when the output current is below a threshold level, and operable in a constant current (CC) mode when the output current reaches the threshold level to use the feedback loop described above to keep its output current capped at a maximum permitted value in order to prevent damage to the SMPS. However, an embodiment of the present invention may alternatively be configured to use the filtered signal $S_F$ in another way, as will now be explained.

Embodiment 2

In the second embodiment of the present invention described herein below, the SMPS controller is configured to regulate the output voltage $V_{out}$ of the SMPS, based not only on a signal that is indicative of $V_{out}$ but also on the signal $S_F$, which provides valuable supplementary information that can be used to facilitate regulation of the output voltage.

State feedback control systems that use measurements of multiple states of a plant are well-known to those skilled in the art. The feedback control loop in such a system may comprise an observer that receives measured signals (e.g. one or more measured currents and one or more measure voltages), and (optionally taking sensor dynamics into account) uses a physical model of the plant to generate an estimate of the plant's state based on the received signals. The feedback control loops also includes a controller which uses the estimated states to generate control signals for the plant. The observer may be a Kalman filter and the controller may be a Linear Quadratic controller (so called "LQG control"), for example. Such systems are well-known to those skilled in the art and will therefore not be described in further detail here.

Figure 6:
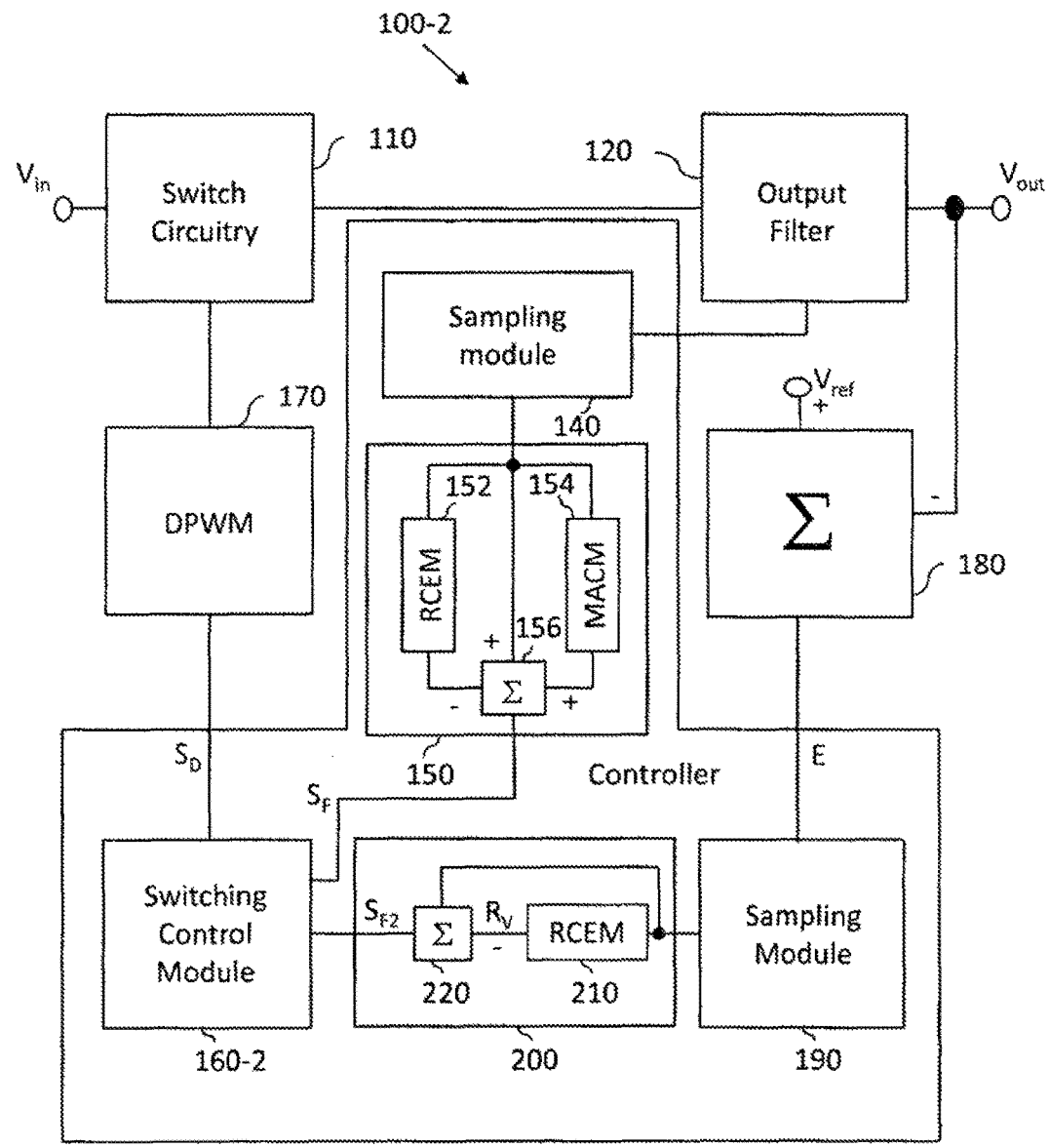
FIG. 6 illustrates functional components of a switched mode power supply according to a second embodiment of the present invention.

The SMPS 100-2 according to the present embodiment is illustrated in FIG. 6. The SMPS 100-2 comprises switch circuitry 110, an output filter 120 and a DPWM 170 that are the same as in the first embodiment. Furthermore, the controller 130-2 of the present embodiment comprises a sampling module 140 and a filter module 150 that are the same as in the first embodiment. The features that are common to these embodiments will not be described again. However, the remaining features shown in FIG. 6 relating to the second embodiment will now be described in detail.

In the present embodiment, the switching control module 160-2 is configured to generate a control signal $S_D$ for controlling the output voltage of the SMPS 100-2 based on both the filtered signal $S_F$ (which is generated in the same way as in the first embodiment) and a second filtered feedback signal, $S_{F2}$, which is generated on the basis of a signal that is indicative of the output voltage $V_{out}$, as will now be explained.

The SMPS 100-2 comprises a feedback loop which is arranged to regulate the output voltage $V_{out}$ of the SMPS 100-2 based on $S_F$ and a signal that is indicative of the output voltage $V_{out}$ of the SMPS. This signal may, for example, be the output voltage $V_{out}$ itself or an error signal E obtained by subtracting one of $V_{out}$ and a reference signal $V_{ref}$ from the other of $V_{out}$ and $V_{ref}$. In the present embodiment, the feedback loop comprises a subtraction module 180 that is configured to subtract $V_{out}$ from $V_{ref}$ and communicate the resulting error signal E to the SMPS controller 130-2 as an example of a signal that is indicative of $V_{out}$.

The controller 130-2 comprises, in addition to the sampling module 140, the filter module 150 and the switching control module 160-2, a second sampling module 190 that is arranged to sample the error signal E at a frequency higher than the switching frequency, $f_{SW}$, of the SMPS 100-2, and to temporarily store the sampled values. The sampling module 190 may, as in the present embodiment, oversample the error signal E by an integer factor N=16. Naturally, the oversampling factor N is not limited to 16 and may take any other integer value selected by the user. In embodiments where N is an integer and the operation of the sampling module 190 is synchronised with the transistor drive signals, N samples of the error signal E are obtained in each switching period T of the SMPS 100-2, with the $i^{th}$ sample in each switching period being spaced apart from the $i^{th}$ sample in the next (or previous) switching period by the switching period T of the SMPS 100-2, and with each of these samples having been obtained at the same time relative to the start of the respective switching period. Thus, the sampling module 190 can be considered to sample and hold N sets of corresponding samples of the error signal E, with the sample acquisition times of the samples in each set being spaced apart from one another by the switching period T. The number of samples in each of these sets may also be selected by the user, and can be considered to define a (moving) time window within which corresponding samples are averaged, as explained further below.

The controller 130-2 may, as in the present embodiment, also include a second filter module 200 arranged to filter out the ripple component of the sampled signal E. The filter module 200 comprises a ripple component estimation module which is, in general, arranged to estimate the voltage ripple component $R_V$ by calculating, for each or some of the samples of the signal that have been received from the sampling module 190, an average sample value (e.g. a mean or a weighted average) using the sample value itself and sample values obtained at corresponding points in preceding switching periods of the SMPS 100-2, each of said corresponding points being separated from the sample by a respective integer number of switching periods of the SMPS. The corresponding points may alternatively be separated from said sample by a respective interval whose length is substantially equal to (i.e. within a tolerance band, such as 2%, 5% or 10%, of) said respective integer number of switching periods. In the present embodiment, the ripple component estimation module 210 is arranged to calculate a weighted average of the sample values (including the sample value itself) in the time window for each of the aforementioned N sets of samples. In this way, the ripple component estimation module 210 is able to obtain a good estimate of what the ripple component $R_V$ should be at any point in time, by exploiting the reproducibility of the ripple from one switching period to the next during stable operation of the SMPS 100-2 (when no transients appear). The averaging process suppresses the influence of outlying sample values on the mean sample value, thereby allowing the voltage ripple component $R_V$ to be estimated with relatively high accuracy.

In the present embodiment, the ripple component estimation module 210 is arranged to estimate the ripple component $R_V$ using an interpolated low-pass filter in the exemplary form of a first-order interpolated recursive moving average filter, which is the same as described above with reference to FIG. 2. The ripple component estimation module 210 may furthermore be modified in the ways described above in connection with the first embodiment.

The filter module 200 also includes a subtraction module 220, which is arranged to subtract the estimated ripple component $R_V$ from the sampled signal output by the sampling module 190 to generate the second filtered signal $S_{F2}$.

The control module 160-2 is arranged to generate the control signal $S_D$ for controlling the switching duty cycle of the SMPS 100-2 based on the filtered signal $S_F$ from the filter module 150 and the second filtered signal $S_{F2}$ from the second filter module 200. The switching control module 160-2 may alternatively be configured to adjust the switching frequency of the SMPS 100-2 or it may adjust both the switching duty cycle and the switching frequency of the SMPS 100-2. In such alternative embodiments, the sampling modules 140 and 190 may be arranged to adjust their sampling frequency so as to keep it an integer multiple of the switching frequency.

In other embodiments, the ripple component estimation module 210 may be arranged to estimate the ripple component $R_V$ using a first-order interpolated low-pass filter in the alternative form of an interpolated Finite Impulse Response (FIR) filter (e.g. an interpolated moving average filter). Higher-order interpolated low-pass filters may alternatively be used, as will be discussed in the following.

It should be noted, however, that the second filter module 200 is optional and may be omitted in other embodiments. In these variants, the switching control module 160-2 may generate the control signal $S_D$ based on $S_F$ and the signal output by the second sampling module 190. Furthermore, the subtraction module 180 could be replaced by a module at the output of the second sampling module 190 (or an operation done by the sampling module itself), which shifts each sample value by a value representative of a target voltage, in order to digitally generate the error signal.

Figure 7:
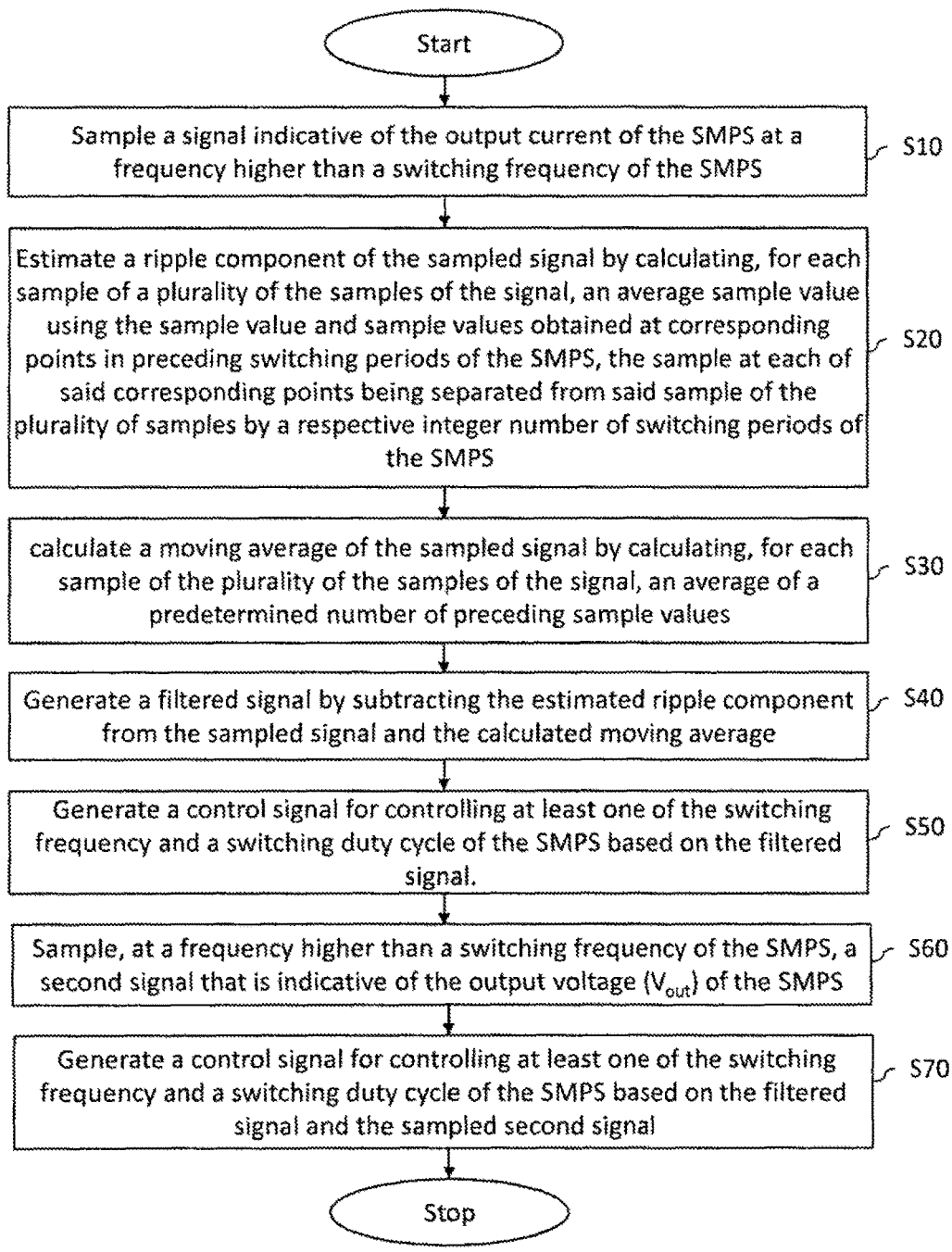
FIG. 7 is a flow diagram illustrating operations performed by the controller in another embodiment to generate control signals for controlling the output voltage of the SMPS.

In such variants of the second embodiment, the processing operations performed by the SMPS controller are illustrated in the flow diagram of FIG. 7. Steps S10 to S40 are the same as those in the process of the first embodiment described above with reference to FIG. 5. The process of the present embodiment differs by steps S60 and S70, which will now be described.

In step S70, the second sampling module 190 samples the error signal E at a frequency higher than $f_{SW}$. The sampling frequency may, as in the present embodiment, be the same as the sampling frequency of the first sampling module 140, and may furthermore be synchronised with the switching of the switch circuitry 110.

In step S80, switching control module generates a control signal $S_D$ for controlling at least one of the switching frequency and the switching duty cycle of the SMPS based on the filtered signal $S_F$ and the signal output by the second sampling module 190 comprising the samples of error signal E.

On the other hand, where the SMPS controller includes a second filter module 200, as in the present embodiment, the process of FIG. 7 would include a further step (performed between steps S60 and S70) of the filter module 200 filtering out the ripple component $R_V$ of the sampled second signal to generate the second filtered signal $S_{F2}$ by: (i) the ripple component estimation module 210 estimating the ripple component $R_V$ of the sampled second signal by calculating, for each sample of a plurality of the samples of the second signal, an average sample value using the sample value and sample values obtained at corresponding points in preceding switching periods of the SMPS 100-2, the sample at each of said corresponding points being separated from said sample of the plurality of samples by a respective integer number of switching periods of the SMPS 100-2; and (ii) the subtraction module 220 subtracting the estimated ripple component of the sampled second signal from the sampled second signal to generate the second filtered signal $S_{F2}$. The switching control module 160-2 would then generate the control signal $S_D$ (in a modified step S70) based on the filtered signal $S_F$ and the second filtered signal $S_{F2}$.

Simulations

Figure 8:
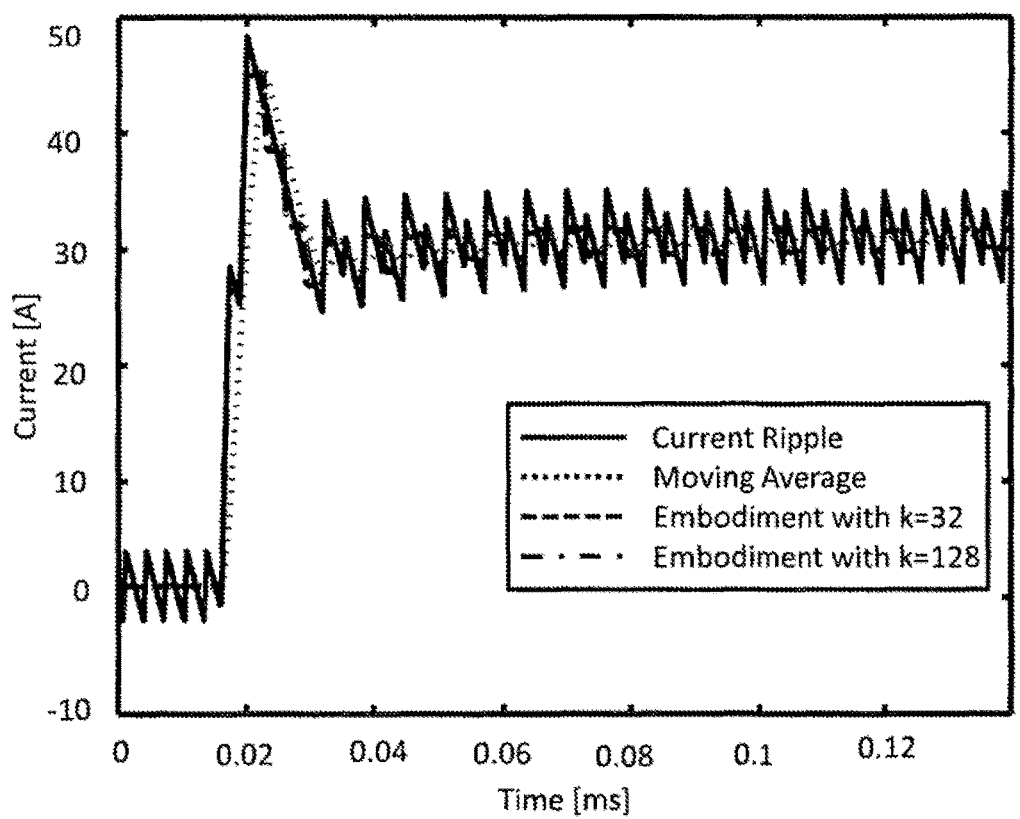
FIG. 8 shows a simulation of the sampled choke current which exhibits a step change and a ripple component (solid line), a signal obtained by filtering the sampled choke current using a conventional moving average filter (dotted line), and signals obtained by filtering the sampled choke current using a filtering module in embodiments of the present invention having k=32 (dashed line) and k=128 (dot-dashed line)

FIG. 8 shows a simulation of the choke current (solid line), which exhibits a step change (at time t≈0.02 ms) and a ripple component. The simulation of a signal obtained by filtering the choke current using a conventional moving average filter is shown by the dotted line. For comparison, FIG. 8 also shows simulations of the signal obtained by filtering the choke current using a filtering module 150 as described in the above embodiments of the present invention with k=32 (dashed line), and with k=128 (dot-dashed line). The oversampling ratio N=16 in both cases. As shown in FIG. 8, the embodiments are effective in attenuating the ripple component of the choke current.

Figure 9:
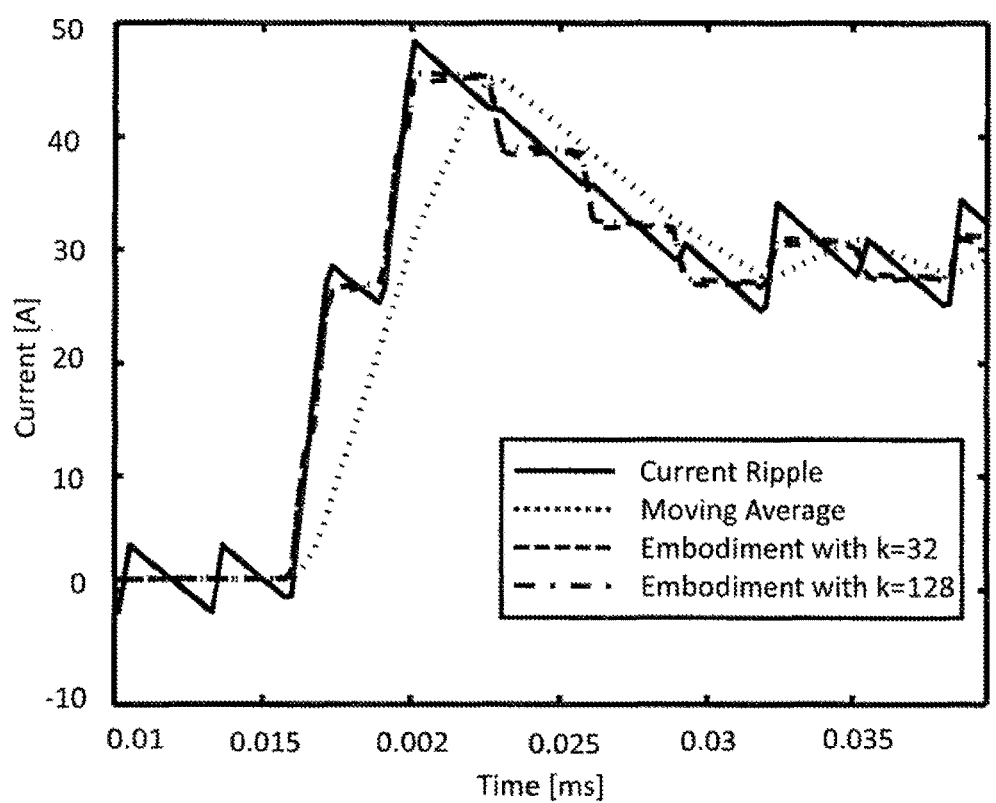
FIG. 9 shows an enlarged view of a portion of FIG. 8.

FIG. 9 shows an enlarged view of a portion of FIG. 8, in the vicinity of the step change in the choke current. These simulation results show that the shape of the transient that passes through the filter module 150 is almost unchanged. Thus, contrary to the result of applying a conventional moving average filter (shown by the dotted line), the embodiments introduce no appreciable delay and leave the transient essentially undistorted. The results in FIGS. 8 and 9 also show that the choice of parameter k is not critical. With N=16, a good choice of k is 32, as it allows the ripple to be effectively filtered without the underlying transient becoming delayed or distorted.

Many variations of the above-described second embodiment are possible. Two such variations will now be described with reference to the figures.

Variant 1

Similar to the filter module 150, the filter module 200 of the second embodiment can effectively suppress the voltage ripple component without significantly delaying or distorting the underlying feedback signal, allowing a good, essentially ripple-free transient signal to be obtained. However, the inventors have found that the transient may cause a "bump" to appear in the trace of the ripple component $R_V$ generated by the ripple component estimation module 210, with the mean voltage of the calculated ripple component $R_V$ (i.e. as averaged over one or more periods of the ripple) temporarily increasing in the vicinity of the transient before returning to its previous value.

A simple way of suppressing the effect of the transient in the ripple component extraction is to increase the factor k. However, this has the draw-back of the filter taking a relatively long time to adjust for changes in the ripple due to, e.g. changes in the load level or the input voltage $V_{in}$. The group delay is k−1 samples for low frequencies, i.e. the pass-band of the filter. Using a corresponding interpolated FIR filter with similar attenuation as the recursive filter with k=100 would have a filter length of N×k and a group delay of Nk/2, which will be very long in many cases and require a lot of memory.

An effective approach to suppressing the appearance of a transient in the extracted voltage ripple component $R_V$ is to increase the order of the filter in the ripple component estimation module 210 to two or higher. The second embodiment may therefore be modified by the provision in the ripple component estimation module 210 of a low-pass filter in the form of, e.g. a Chebychev Type 2 filter of order three, with a normalized band stop frequency of 0.1, where 1 corresponds to the Nyquist frequency and the attenuation in the stop band is 80 dB. By appropriate design of the higher-order filter, the latency can be reduced compared with the extremely low bandwidth first-order filter.

However, it should be noted that the Chebychev Type 2 filter is only an example of a higher-order filter that is optimised to yield a flat response in the pass-band and equal ripple in the stop-band. Other optimizations, such as Butterworth, Chebychev Type-1, elliptic, or even Bessel could alternatively be used. Another possibility would be a filter optimized for minimizing the number of 1's, which would simplify hardware requirements for the multiplications.

Variant 2

Figure 10:
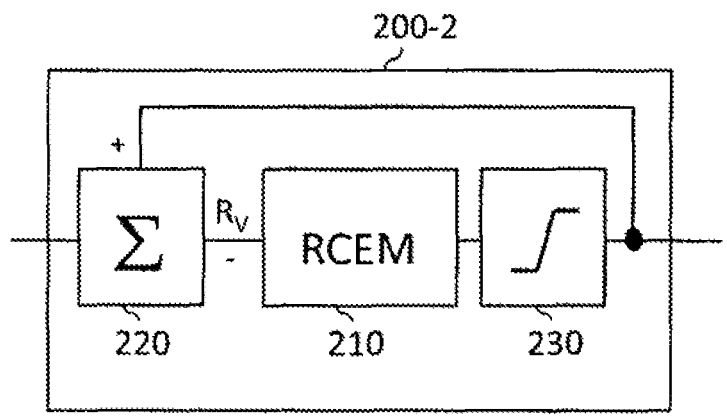
FIG. 10 illustrates functional components of the filter module 200 in a variant of the second embodiment.

Another effective but simpler approach to suppressing the appearance of the transient in the extracted ripple component is to saturate the signal input to the ripple component estimation module 210 just above the normal ripple level. The present variant is based on this approach and differs from the second embodiment by the modified filter module 200-2 of the present embodiment further comprising, as shown in FIG. 10, a clipping module 230 that is arranged to process the sampled signal by clipping the sampled signal when it exceeds a threshold level, preferably just above the normal ripple level (e.g. 2, 5 or 10% above the ripple level during stable operation of the SMPS, when no voltage transients occur). In other words, the clipping module 230 performs a signal clipping operation, allowing the signal input thereto to pass through unchanged if the amplitude of the input signal is below the threshold level, and outputting a signal at the threshold level when the input signal amplitude is at or above the threshold level. The present variant is otherwise the same as the second embodiment. In the present variant, the ripple component estimation module 210 is arranged to estimate the ripple component $R_V$ by calculating, for each of a plurality of samples of the processed signal, an average of the sample value and the values of samples at corresponding points in preceding switching periods of the SMPS 100-2 that have been sampled and processed by the clipping module 230.

The operations performed by the controller of the present variant are as described above in connection with the second embodiment, except that a further step of processing the sampled signal by clipping the sampled signal when it exceeds a threshold is performed. The ripple component $R_V$ is then estimated by calculating, for each of the plurality of samples of the signal from the clipping module 230, an average of the sample value and the values of samples at corresponding points in preceding switching periods of the SMPS 100 that have been sampled and processed by the clipping module 230.

Variant 3

Figure 11:
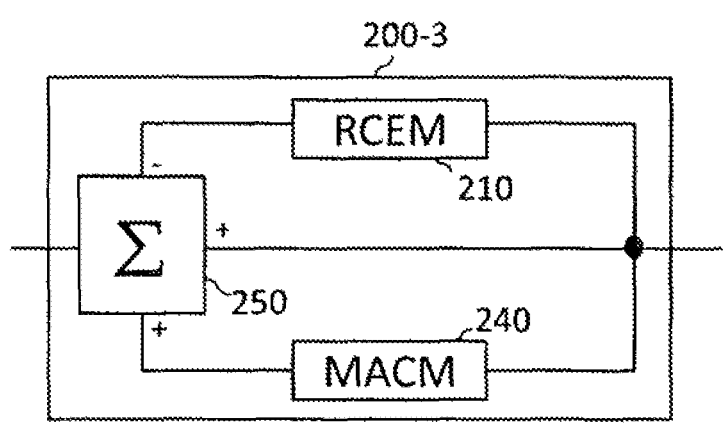
FIG. 11 illustrates functional components of the filter module 200 in another variant of the second embodiment.

The configuration of the filter module 200 of the second embodiment described above allows the ripple component to be effectively removed whilst allowing variations in the output voltage $V_{out}$ of the SMPS 100-2 to propagate to the switching control module 160-2, provided that those output voltage variations occur on a time scale that is not much longer than the aforementioned time window that is used by the ripple component estimation module 210 to calculate the average sample values. This is because, during operation of the SMPS 100-2 in the case where $V_{out}$ is essentially constant on the time scale of the averaging window, the result of subtracting the estimated ripple component from the sampled output voltage signal is substantially zero, regardless of the value of $V_{out}$-$V_{ref}$. In order to make the filter module more effective in suppressing slow drifts of the output voltage of the SMPS 100-2 from the target value, the filter module may be adapted to further comprise a moving average calculation module that is arranged to calculate a moving average of the sampled second (error) signal by calculating, for each sample of a plurality of the samples of the second signal, an average (e.g. a mean) of a predetermined number of preceding sample values (e.g. kN preceding sample values). In this variant, the subtraction module would be arranged to generate the second filtered signal by subtracting the estimated ripple component from the sampled signal and the calculated moving average. A modified filter module 200-3 according to such a variant is illustrated in FIG. 11, and comprises a ripple component estimation module 210 as in the second embodiment, as well as a moving average calculation module (MACM) 240 and a modified subtraction module 250. The MACM 240 effectively suppresses any DC output voltage error/offset that might be introduced into the system (e.g. at start-up of the SMPS). In this variant, the process described above in connection with the second embodiment would be modified by inclusion of an additional step of calculating a moving average of the sampled signal by calculating, for each sample of a plurality of the samples of the second signal, an average of a predetermined number of preceding sample value. The second filtered signal would then be generated by subtracting the estimated ripple component from the sampled second signal and the calculated moving average of the sampled second signal.

Modifications and Variations

Many modifications and variations can be made to the embodiments described above.

For example, the order in which some of the steps of the above-described methods are performed may be changed. Steps S20 and S30 in FIGS. 5 and 7 may be reversed or performed concurrently, for example. As another example, step S60 in FIG. 7 may be performed any point prior to step S70, and may therefore precede or be performed concurrently with any of steps S10 to S40.

Although the controller of the above embodiments is configured to suppress a ripple component of the feedback signal at the switching frequency of the SMPS 100, the controller may alternatively or additionally have one or more parallel modules arranged to suppress a ripple component of the feedback signal at one or more harmonics of the fundamental frequency of the ripple component. In these embodiments, the sampling frequency could, for example, be set to N×2$f_{SW}$ to eliminate the second harmonic, N×3$f_{SW}$ to eliminate the third harmonic, etc.

Furthermore, the filter module 150 and/or 200 need not perform its averaging calculations using sample values located at corresponding points in consecutive periods of the ripple component to be filtered out. Thus, adjacent corresponding points considered in the estimation may alternatively be separated from each other by an integer number of ripple periods that is greater than one.

As another modification, the oversampling factor N does not need to be an integer. If, for example, N was set to 16.5, the received signal would be sampled at corresponding points every two switching periods. The filter module 150 or 200 would in that case estimate an average sample value by using sample values which are separated from the sample by an even integer number of switching periods (i.e. multiple of 2).

The invention claimed is:

1. A controller for controlling an output current of a switched mode power supply, SMPS, the controller comprising:
a sampling module arranged to sample a signal indicative of the output current of the SMPS at a frequency higher than a switching frequency of the SMPS;
a filter module arranged to filter out a ripple component of the sampled signal, comprising:
a ripple component estimation module arranged to estimate the ripple component by calculating, for each sample of a plurality of the samples of the signal, an average sample value using each sample value and prior sample values obtained at corresponding points in preceding switching periods of the SMPS, the sample at each of said corresponding points being separated by a respective integer number of switching periods of the SMPS;
a moving average calculation module arranged to calculate a moving average of the sampled signal by calculating, for each sample of the plurality of the samples of the signal, an average of a predetermined number of preceding sample values; and,
a subtraction module arranged to generate a filtered signal by subtracting the estimated ripple component from a sum of the sampled signal and the calculated moving average; and,
a switching control module arranged to generate a control signal for controlling at least one of the switching frequency and a switching duty cycle of the SMPS based on the filtered signal.

2. The controller according to claim 1, wherein the sampling module is arranged to sample the signal indicative of the output current of the SMPS at a frequency that is an integer multiple of the switching frequency of the SMPS.

3. The controller according to claim 1, wherein the ripple component estimation module is arranged to estimate the ripple component by use of an interpolated low-pass filter.

4. The controller according to claim 3, wherein the interpolated low-pass filter is an interpolated Finite Impulse Response filter.

5. The controller according to claim 4, wherein the interpolated Finite Impulse Response filter is an interpolated moving average filter.

6. The controller according to claim 3, wherein the interpolated low-pass filter is an interpolated recursive moving average filter.

7. The controller according to claim 3, wherein the interpolated low-pass filter is of order 2 or higher.

8. The controller according to claim 6, wherein the sampling module is arranged to sample the signal indicative of the output current of the SMPS at a frequency N·$f_{SW}$, where N is an integer and N·$f_{SW}$ is the switching frequency of the SMPS, and the interpolated recursive moving average filter comprises:
a first scaling module arranged to receive sample values of the sampled signal and scale each of the received sample values by a factor 1/k, where k is an integer indicative of the number of switching periods of the SMPS in the calculation of the average sample value performed by the ripple component estimation module;

a summing module arranged to add each of the scaled sample values to a respective sum of scaled sample values to generate a respective addition result; and, a feedback loop comprising:

a delay module arranged to receive the addition results in the order in which the addition results are generated by the summing module, store N of the received addition results at a time, and output a stored addition result when an addition result is received by the delay module such that the stored addition results are output in the same order as they were received by the delay module; and, a second scaling module arranged to receive the addition results from the delay module in the order in which they are output by the delay module and scale each received addition result by a factor 1−1/k to generate the respective sum of scaled sample values that is to be added to the respective scaled sample value by the summing module.

9. The controller according to claim 8, wherein the moving average calculation module is arranged to calculate the moving average of the sampled signal by use of a non-interpolated modified moving average filter that comprises:

a third scaling module arranged to receive sample values of the sampled signal and scale each of the received sample values by a factor 1/kN;

a second summing module arranged to add each of the scaled sample values from the third scaling module to a respective sum of scaled sample values to generate a respective addition result; and, a second feedback loop comprising:

second delay module arranged to receive the addition results in the order in which the addition results are generated by the second summing module, store one received addition result at a time, and output a stored addition result when an addition result is received by the second delay module such that the stored addition results are output in the same order as they were received by the second delay module; and, a fourth scaling module arranged to receive the addition results from the second delay module in the order in which they are output by the second delay module and scale each received addition result by a factor 1−1/kN to generate the respective sum of scaled sample values that is to be added to the respective scaled sample value by the second summing module.

10. The controller according to claim 1, the controller further comprising:

a second sampling module arranged to sample, at a frequency higher than the switching frequency of the SMPS, a second signal that is indicative of the output voltage of the SMPS;

wherein the switching control module is further arranged to generate the control signal for controlling at least one of the switching frequency and the switching duty cycle of the SMPS based on the sampled second signal.

11. The controller according to claim 10, further comprising:

a second filter module that is operable to filter out a ripple component of the sampled second signal to generate a second filtered signal, the second filter module comprising:

a second ripple component estimation module arranged to estimate the ripple component of the sampled second signal by calculating, for each sample of a plurality of the samples of the second signal, an average sample value using the sample value and sample values obtained at corresponding points in preceding switching periods of the SMPS, the sample at each of said corresponding points being separated from said sample of the plurality of samples by a respective integer number of switching periods of the SMPS; and, a second subtraction module arranged to generate the second filtered signal by subtracting the estimated ripple component of the sampled second signal from the sampled second signal, wherein the switching control module is arranged to generate the control signal based on the filtered signal and the second filtered signal.

12. The controller according to claim 11, wherein the second sampling module is arranged to sample the second signal at a frequency that is an integer multiple of the switching frequency of the SMPS.

13. The controller according to claim 11, wherein the second ripple component estimation module is arranged to estimate the ripple component of the sampled second signal by use of an interpolated low-pass filter.

14. The controller according to claim 11, wherein the second filter module further comprises a clipping module arranged to process the sampled second signal by clipping the sampled second signal when it exceeds a threshold level, and the second ripple component estimation module is arranged to estimate the ripple component of the sampled second signal by calculating, for each sample of a plurality of samples of the processed second signal, an average sample value using the sample value and sample values obtained at corresponding points in preceding switching periods of the SMPS that have been sampled and processed.

15. The controller according to claim 11, wherein:

the second filter module further comprises a second moving average calculation module arranged to calculate a moving average of the sampled second signal by calculating, for each sample of a plurality of the samples of the second signal, an average of a predetermined number of preceding sample values; and, the second subtraction module is arranged to generate the second filtered signal by subtracting the estimated ripple component of the sampled second signal from the sampled second signal and the calculated moving average of the sampled second signal.

16. A method of controlling an output current of a switched mode power supply, SMPS, the method comprising:

sampling a signal indicative of the output current of the SMPS at a frequency higher than a switching frequency of the SMPS;

estimating a ripple component of the sampled signal by calculating, for each sample of a plurality of the samples of the signal, an average sample value using each sample value and prior sample values obtained at corresponding points in preceding switching periods of the SMPS, the sample at each of said corresponding points being separated by a respective integer number of switching periods of the SMPS;

calculating a moving average of the sampled signal by calculating, for each sample of the plurality of the samples of the signal, an average of a predetermined number of preceding sample values;

generating a filtered signal by subtracting the estimated ripple component from a sum of the sampled signal and the calculated moving average; and, generating a control signal for controlling at least one of the switching frequency and a switching duty cycle of the SMPS based on the filtered signal.

17. The method according to claim 16, wherein the signal indicative of the output current of the SMPS is sampled at a frequency that is an integer multiple of the switching frequency of the SMPS.

18. The method according to claim 16, wherein the ripple component is estimated by use of an interpolated low-pass filter.

19. The method according to claim 18, wherein the interpolated low-pass filter is an interpolated Finite Impulse Response filter.

20. The method according to claim 19, wherein the interpolated Finite Impulse Response filter is an interpolated moving average filter.

21. The method according to claim 18, wherein the interpolated low-pass filter is an interpolated recursive moving average filter.

22. The method according to claim 18, wherein the interpolated low-pass filter is of order 2 or higher.

23. The method according to claim 16, the method further comprising:
sampling, at a frequency higher than a switching frequency of the SMPS, a second signal that is indicative of the output voltage of the SMPS; and,
wherein generating the control signal for controlling at least one of the switching frequency and the switching duty cycle of the SMPS is further based on the sampled second signal.

24. The method according to claim 23, further comprising:
filtering out a ripple component of the sampled second signal to generate a second filtered signal by:
estimating the ripple component of the sampled second signal by calculating, for each sample of a plurality of the samples of the second signal, an average sample value using each sample value and prior sample values obtained at corresponding points in preceding switching periods of the SMPS, the sample at each of said corresponding points being separated by a respective integer number of switching periods of the SMPS; and,
subtracting the estimated ripple component of the sampled second signal from the sampled second signal to generate the second filtered signal;
wherein the control signal is generated based on the filtered signal and the second filtered signal.

25. The method according to claim 24, wherein the second signal is sampled at a frequency that is an integer multiple of the switching frequency of the SMPS.

26. A method according to claim 24, wherein the ripple component of the sampled second signal is estimated by use of an interpolated low-pass filter.

27. The method according to claim 24, further comprising:
processing the sampled second signal by clipping the sampled second signal when it exceeds a threshold level;
wherein the ripple component of the sampled second signal is estimated by calculating, for each sample of a plurality of samples of the processed second signal, an average sample value using each sample value and prior sample values obtained at corresponding points in preceding switching periods of the SMPS that have been sampled and processed.

28. The method according to claim 24, further comprising:
calculating a moving average of the sampled second signal by calculating, for each sample of a plurality of the samples of the second signal, an average of a predetermined number of preceding sample values;
wherein the second filtered signal is generated by subtracting the estimated ripple component of the sampled second signal from a sum of the sampled second signal and the calculated moving average of the sampled second signal.

* * * * *